S. WHALEN.
CALIPERS.
No. 51,767. Patented Dec. 26, 1865.
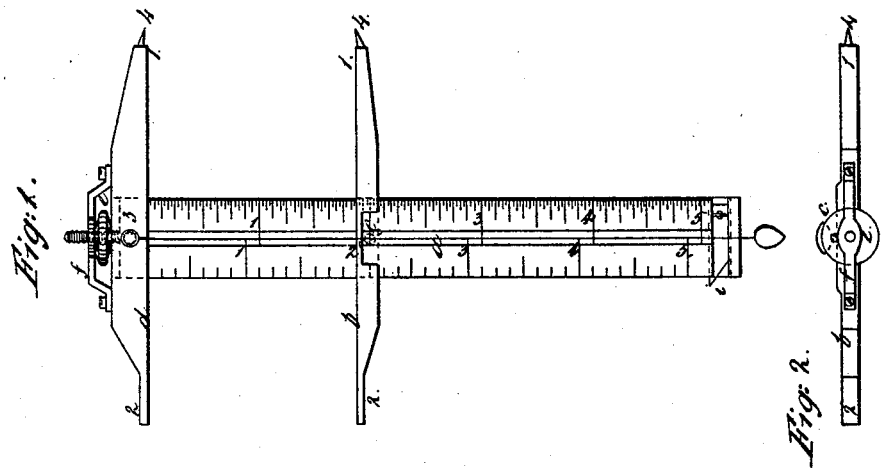
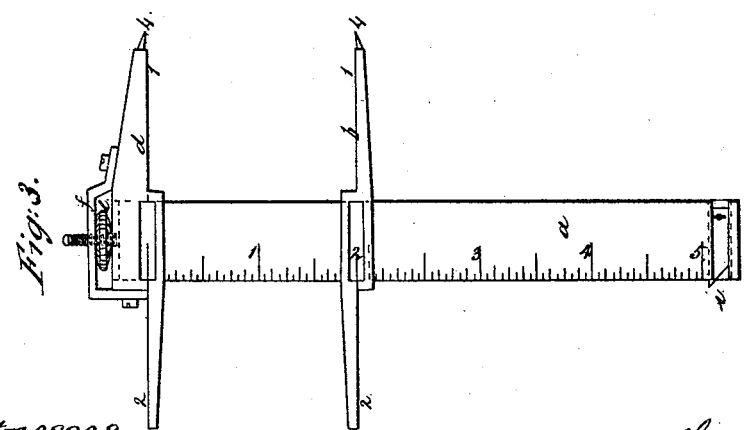
Witnesses.
Frank Whalen
H. Whalen
Inventor.
Seth Whalen

UNITED STATES PATENT OFFICE.

SETH WHALEN, OF BURNT HILLS, NEW YORK.

IMPROVEMENT IN CALIPERS.

Specification forming part of Letters Patent No. 51,767, dated December 26, 1865.

*To all whom it may concern:*

Be it known that I, SETH WHALEN, of Burnt Hills, in the county of Saratoga and State of New York, have invented and made a certain new and useful Improvement in Calipers and Dividers; and I do hereby declare the following to be a full, clear, and exact description of the said invention, reference being had to the annexed drawings, making part of this specification, wherein—

Figure 1 is an elevation of my said instrument; and Fig. 2 is a view, endwise, of the same; and Fig. 3 represents a slight modification in my improved instrument.

Similar marks of reference denote the same parts.

The nature of my said invention consists in a rule carrying two cross-heads or T's, one of which is adjusted slightly by a nut. The other is movable along the rule, and the cross heads on one side are adapted to the measurement of interior diameters or sizes and the other side to the measurement of external sizes, and I employ points on the ends of said cross-heads to be used as dividers, and a point or scribing knife is inserted in the rule, so as to serve as a carpenter's or machinist's gage.

In the drawings, $a$ is the rule, which I prefer to be formed of a steel blade. $b$ is a cross-head or T, fitted accurately to the rule $a$ at right angles to the same, and capable of sliding along on the rule to any desired position, where it is held by a clamping-screw, $c$, Fig. 2, and shown by dotted lines in Fig. 1.

$d$ is the second cross-head or T, fitted to one end of the rule $a$, and adjusted with accuracy by means of a nut, $e$, that is upon a screw that projects from the end of $a$, said nut $e$ being retained by a yoke or strap, $f$.

The ends 1 1 of the T's $b$ and $d$ are intended for measuring external dimensions, and the divisions on that side of the rule $a$ are made accordingly. The ends 2 2 of the T's $b$ and $d$ are intended for measuring internal dimensions. Hence the divisions on that side of the rule $a$ are made so as to allow for the thickness of these ends 2 2, as shown by the numbering of the rule in the drawings, Fig. 1. The same character of T cross-heads is shown in Fig. 3, with the exception that the sides 1 1 for the measuring of external diameters or dimensions are on line with the sides 2 2 for measuring internal dimensions, and the divisions of the rule $a$ may be observed through openings in the respective T cross-heads. By adjusting the T cross-head to any desired point the calipers may be used for measuring either internal or external dimensions. A groove at one end of the rule $a$ receives a gage knife or point, $i$, that may be slid out more or less and used as a gage, the moving cross-head $b$ being adjusted to the given distance from the gage.

A plumb-line may be hung on the pin 3, as seen by red lines in Fig. 1, and give by the rule and cross-head both vertical and horizontal positions.

The points 4 4 enable me to use this instrument in the capacity of dividers, and these points may be either inserted permanently or be needle-points held in by screws.

What I claim, and desire to secure by Letters Patent, is—

The rule $a$, in combination with the adjustable cross-heads or T's $b$ and $d$, forming calipers for external and internal measurements, as specified.

In witness whereof I have hereunto set my signature this 11th day of September, A. D. 1865.

SETH WHALEN.

Witnesses:
FRANK WHALEN,
H. WHALEN.